(12) United States Patent
Akiba et al.

(10) Patent No.: US 6,574,418 B1
(45) Date of Patent: Jun. 3, 2003

(54) APPARATUS AND METHOD FOR REPRODUCTION AND DISTRIBUTION MEDIUM

(75) Inventors: Toshiya Akiba, Kanagawa (JP); Takao Takahashi, Tokyo (JP); Masashi Ohta, Tokyo (JP); Toshimichi Hamada, Tokyo (JP); Taro Suito, Kanagawa (JP); Koichi Chotoku, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/325,147

(22) Filed: Jun. 3, 1999

(30) Foreign Application Priority Data

Jun. 5, 1998 (JP) .......................................... 10-157521

(51) Int. Cl.[7] ................................................ H04N 5/91
(52) U.S. Cl. ........................... 386/74; 386/104; 386/105
(58) Field of Search ............................... 386/46, 68, 75, 386/104, 105, 125, 96; 704/214

(56) References Cited

U.S. PATENT DOCUMENTS 5,809,454 A * 9/1998 Okada et al. ................ 704/214

FOREIGN PATENT DOCUMENTS

JP        411088830 A  *  3/1999

* cited by examiner

Primary Examiner—Huy Nguyen
(74) Attorney, Agent, or Firm—Frommer Lawrence & Haug LLP; William S. Frommer; Dennis M. Smid

(57) ABSTRACT

To perform non-normal speed reproduction without preventing a user from understanding of the program content. The audio data which has been blocked into blocks of a predetermined time unit is stored in a buffer. Blocks having the level equal to or lower than a predetermined threshold value are treated as silence data, and the block numbers are stored in a silence pointer buffer. A read out address generating unit does not read out blocks which is stored in the silence pointer buffer when the read out address buffer reads out audio data blocks from the buffer. The audio data from which silence data blocks have been excluded is subjected to connection processing in a waveform connection processing unit so that noise is not generated. A skip pattern generating unit controls a video data processing unit so that the video data is sent out with skipping some video data corresponding to blocks treated as silence block stored in the silence pointer buffer.

11 Claims, 14 Drawing Sheets

CALCULATE ERROR BETWEEN WAVEFORMS FROM RELATIVE CORRELATION FUNCTION AND CALCULATE MINIMUM CONNECTION POSITION OF ERROR

FIG. 10A
FIG. 10B
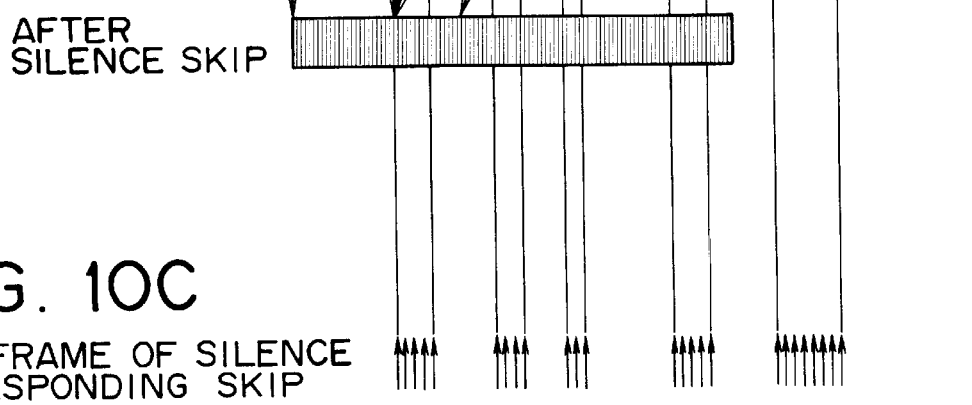
AFTER SILENCE SKIP
FIG. 10C
SKIP FRAME OF SILENCE CORRESPONDING SKIP
FIG. 11A
FIG. 11B
EXPAND SILENCE TIME PERIOD
FIG. 11C

FIG. 13

| SPEED | I | B | B | P | B | B | P | B | B | P | B | B |
|---|---|---|---|---|---|---|---|---|---|---|---|---|
| 1.07 |   | X |   |   |   |   |   |   |   |   |   |   |
| 1.15 |   | X |   |   |   |   |   | X |   |   |   |   |
| 1.25 |   | X |   |   |   | X |   |   |   |   | X |   |
| 1.36 |   | X |   |   | X |   |   |   | X |   |   | X |
| 1.5  |   | X |   |   | X | X |   | X |   |   | X |   |
| 1.67 |   | X |   |   | X |   |   | X | X | X |   |   |
| 1.88 |   | X |   |   | X |   |   | X | X | X |   | X |
| 2.14 |   | X | X |   | X |   |   | X | X | X |   | X |
| 2.5  |   | X | X |   | X | X |   | X | X | X |   | X |
| 3.0  |   | X | X |   | X | X |   | X | X | X | X | X |

1 GOP

X skip B Picture

FIG. 14

| SPEED | I | B | B | P | B | B | P | B | B | P | B | B |
|---|---|---|---|---|---|---|---|---|---|---|---|---|
| 0.94 |   | O |   |   |   |   |   |   |   |   |   |   |
| 0.88 |   | O |   |   |   |   |   | O |   |   |   |   |
| 0.83 |   | O |   |   |   | O |   |   |   |   | O |   |
| 0.79 |   | O |   |   | O |   |   | O |   |   | O |   |
| 0.75 |   | O |   | O |   | O |   |   | O |   |   | O |

1 GOP

O TWICE DISPLAY FRAME (PRIOR ART)

APPARATUS AND METHOD FOR REPRODUCTION AND DISTRIBUTION MEDIUM

BACKGROUND OF THE INVENTION

1. Field of the Invention

This invention relates to an apparatus and a method for recording/reproduction and a distribution medium, and more particularly relates to an apparatus and a method for recording/reproduction and a distribution medium for transmitting the content of a program which is being reproduced to a user without damage by thinning silence portion together with image in monitoring audio signals particularly during non-normal speed reproduction.

2. Description of Related Art

In a conventional recording/reproduction apparatus such as a VTR (video tape recorder), video signals and audio signals are thinned with a certain time interval during non-normal speed reproduction. The operation for, for example, triple-speed reproduction is described with reference to FIG. 17.

FIG. 17 is a diagram for illustrating the relation between heads and recording tracks during triple-speed reproduction performed by a recording/reproduction apparatus having two reproducing heads. In normal reproduction, the head A and the head B reproduce tracks alternately one by one. In the case of triple-speed reproduction, the head A and the head B reproduce every third track. In detail, two tracks out of three tracks are not reproduced (thinned) and thus triple-speed reproduction is performed.

However, the above-mentioned conventional recording/reproduction apparatus thins data by rote regardless of the content of the video data or audio data during non-normal speed reproduction, in this case key words which are necessary for a user to understand the program content are thinned, as the result the user can not understand the program content, such thinning is inconvenient for the user.

Further, a reproduction speed is selected from among only the predetermined set values, and a user can not set the reproduction speed to a desired reproduction speed.

The present invention was accomplished to solve the above-mentioned problem, and the content of a program which is being reproduced is transmitted to a user without damage by thinning silence portion together with image in monitoring audio signals particularly during non-normal speed reproduction.

SUMMARY OF THE INVENTION

A recording/reproduction apparatus comprises reproducing means for reproducing the audio data, blocking means for blocking the audio data reproduced by the reproducing means into blocks of predetermined time unit, setting means for setting a threshold value of the silence block to be treated as silence data corresponding to an indicated reproduction speed, removing means for removing silence blocks of the level equal to or lower than the threshold value set by the setting means, and connecting means for connecting the blocks from which the silence blocks have been removed by the removing means.

A reproduction method comprises a step for reproducing the audio data, a step for blocking the input audio data into blocks of a predetermined time unit, a step for setting a threshold value of silence blocks to be treated as silence data corresponding to an indicated reproduction speed, a step for removing silence blocks of the level equal to or lower than the set threshold value, and a step for connecting the blocks from which the silence blocks have been removed.

A distribution medium for providing a program which is readable by a computer for executing a process comprises a step for blocking the input audio data into blocks of a predetermined time unit, a step for setting a threshold value of silence blocks to be treated as silence data corresponding to an indicated reproduction speed, a step for removing silence blocks of the level equal to or lower than the set threshold value, and a step for connecting the: blocks from which the silence blocks have been removed.

A reproduction apparatus comprises reproducing means for reproducing the audio data, blocking means for blocking the audio data reproduced by the reproducing means into blocks of a predetermined time unit, removing means for removing blocks of the level equal to or lower than a preset threshold value as silence block, connection means for connecting the blocks from which the silence blocks have been removed by the removing means, and setting means for setting a reproduction speed corresponding to the quantity of the silence blocks.

A recording/reproduction method comprises a step for reproducing the audio data, a step for blocking the reproduced audio data into blocks of a predetermined time unit, a step for removing blocks of the level equal to or lower than a preset threshold value as silence block, a connection step for connecting the blocks from which the silence blocks have been removed, and a setting step for setting a reproduction speed corresponding to the quantity of the silence blocks.

A distribution medium for providing a program which is readable by a computer for executing a process comprises a blocking step for blocking the input audio data into blocks of a predetermined time unit, a removing step for removing blocks of the level equal to or lower than a preset threshold value as silence block, a connection step for connecting the blocks from which the silence blocks have been removed in the removing step, and a setting step for setting a reproduction speed corresponding to the quantity of the silence blocks.

According to the recording/reproduction apparatus, the recording/reproduction method, and the distribution medium, the input audio data is blocked into blocks of a predetermined time unit, a threshold value of the silence block to be treated as silence data is set correspondingly to an indicated reproduction speed, the silence blocks having the level equal to or lower than the set threshold value are removed, and the blocks from which the silence blocks have been removed are connected each other.

According to the recording/reproduction apparatus, the recording/reproduction method, and the distribution medium, the input audio data is blocked into blocks of a predetermined time unit, blocks having the level equal to or lower than a preset threshold value is removed as the silence block, the blocks from which silence blocks have been removed are connected each other, and the reproduction speed is set corresponding to the quantity of the silence blocks.

BRIEF DESCRIPTION OF THE DRAWINGS

FIG. 10 is a diagram for describing the relation between silence data and the video data in non-normal speed reproduction.

FIG. 11 is a diagram for illustrating the relation between silence data and the video data in non-normal speed reproduction.

FIG. 13 is a diagram for describing the relation between the non-normal speed reproduction and the video data to be skipped.

FIG. 14 is a diagram for describing the relation between the non-normal speed reproduction and the video data to be displayed twice.

DETAILED DESCRIPTION OF THE PREFERRED EMBODIMENTS

Figure 1:
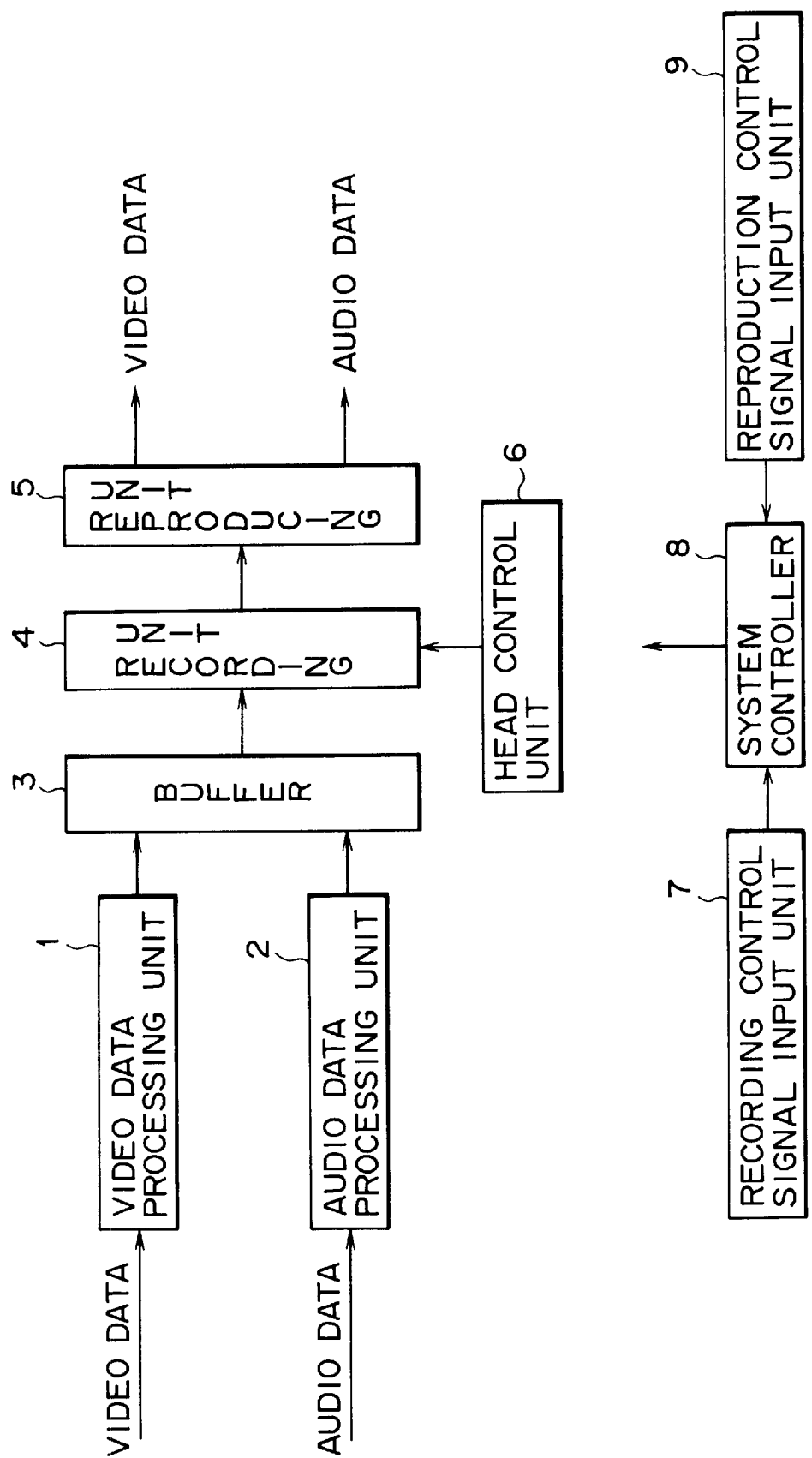
FIG. 1 is a block diagram for illustrating an embodiment of a recording/reproduction apparatus of the present invention.

FIG. 1 is a block diagram for illustrating the structure of a recording/reproduction apparatus accordance with one embodiment of the present invention. The video data received by way of an antenna not shown in the drawing is supplied to a video data processing unit 1 and on the other hand the audio data is supplied to an audio data processing unit 2, and these data are subjected to processing such as compression. The video data processed by the video data processing unit 1 and the audio data processed by the audio data processing unit 2 are supplied to a buffer 3.

The buffer 3 stores the input data temporarily and absorbs the rate fluctuation by intermittent writing in a recording unit 4. The recording unit 4 is a recording medium such as a digital video cassette tape, a head (not shown in the drawing), which is controlled by a head controller 6, writes/reads data in/from the recording unit 4.

The video data and audio data recorded in the recording unit 4 is read out by a reproducing unit 5 and subjected to, for example, expansion processing, and provided to a television receiver or the like not shown in the drawing.

A system controller 8 controls the above-mentioned units based on input data (commands) supplied from a recording control signal input unit 7 and data supplied from a reproduction control signal input unit 9. When a user operates a remote controller not shown in the drawing, the recording control signal input unit 7 and reproduction control signal input unit 9 receive the data and provides the input data to the system controller 8.

Figure 2:
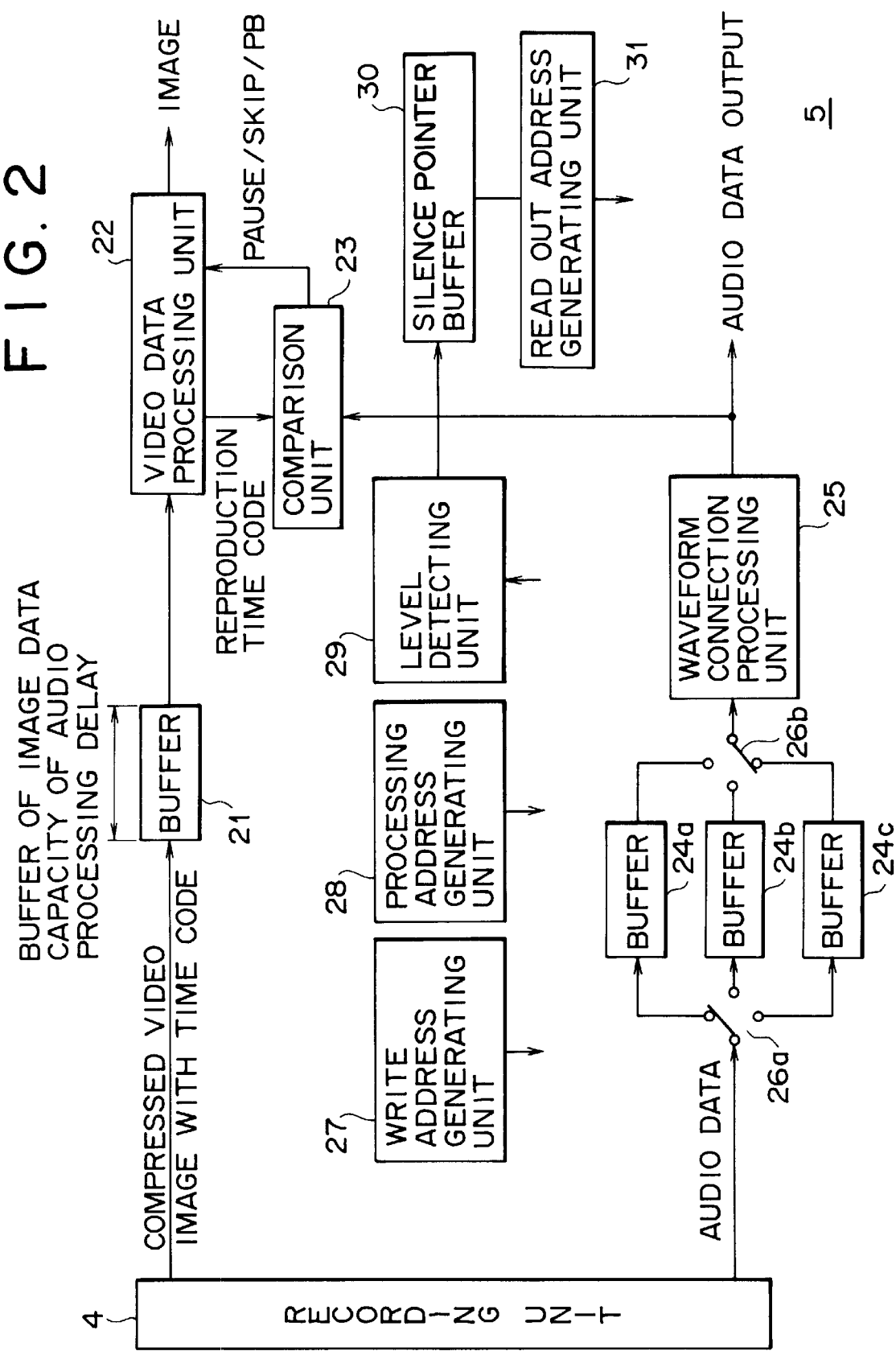
FIG. 2 is a block diagram for illustrating the detail of a reproducing unit.

FIG. 2 is a block diagram for illustrating the detailed structure of the reproducing unit 5. The video data recorded in the recording unit 4 is read out in response to a command supplied from the system controller 8 (FIG. 1), and stored temporarily in the buffer 21. The video data stored in the buffer 21 is provided to a video data processing unit 22. A reproduction time code of the video data supplied to the video data processing unit 22 is supplied to a comparison unit 23. The comparison unit 23 receives the audio signal input provided from a waveform connection processing unit 25 and returns the data which is obtained by comparing the reproduction time code of the audio data and the reproduction time code of the video data to the video data processing unit 22.

Similarly, the audio data stored in the recording unit 4 is supplied to buffers 24a to 24c (?1) (if discrimination between the respective buffers 24a to 24c is not necessary, the buffers are simply referred to as buffer 24 hereinafter) by way of a switch 26a, and stored temporarily. The audio data stored in the buffer 24 is provided to the waveform connection processing unit 25 by way of a switch 26b. The waveform connection processing unit 25 performs waveform connection processing of the input audio data so as not to generate noise, and provides to a speaker (not shown in the drawing).

A write address generating unit 27, processing address generating unit 28, and read out address generating unit 31 generate addresses to the respective corresponding buffers 24. A level detecting unit 29 detects the level of each audio data when a silence data is detected as described hereinafter. A silence pointer buffer 30 determines a silence data to be skipped based on the detected level and stores the data number, and reads out silence data numbers and provides to the address generating unit 31.

Next, audio data processing performed by the reproducing unit 5 is described with reference to a flow chart shown in FIG. 3. It is assumed that a user sets a reproduction speed by use of a remote controller not shown in the drawing.

The buffers 24a to 24c perform writing, and detection and reading out of silence data repeatedly. In detail, the audio data recorded in the recording unit 4 is written in the buffer 24a while the switch 26a is connected to the buffer 24a, the buffer 24b processes the audio data temporally precedent to the audio data processed by the buffer 24a according to the flow chart shown in FIG. 3, and the buffer 24c provides the data temporally precedent to the data processed by the buffer 24b by way of the switch 26b.

As described herein above, write processing, and detection and reading out processing of silence data are allotted to the respective buffers 24a to 24c in the order so that the audio data is supplied continuously to the waveform connection processing unit 25, as the result, even if a processing which causes delay such as detection of silence data is performed, the interruption of the voice is prevented.

Figure 3:
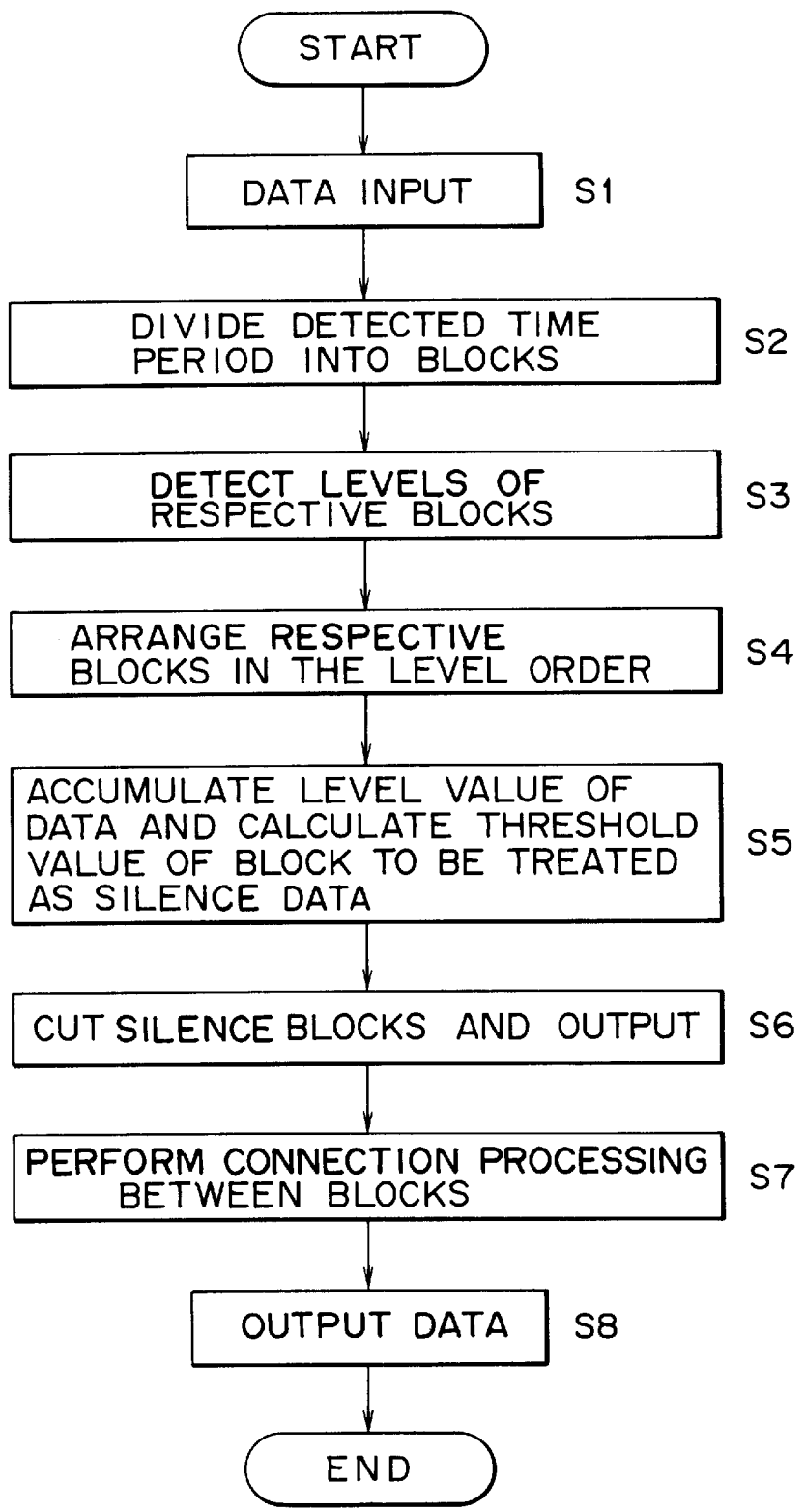
FIG. 3 is a flow chart for describing the operation of the reproducing unit.

In step S1 in FIG. 3, the audio data is supplied from the recording unit 4 to any one buffer out of the buffers 24a to 24c based on an address generated from the write address generating unit 27. It is assumed that the audio data is supplied to the buffer 24b herein. Therefore, the buffer 24b is connected to the recording unit 4 by way of the switch 26a. The data quantity to be written in the buffer 24b is predetermined to be of several seconds.

When input of the audio data in step S1 is finished, the switch 26a is connected to the buffer 24c. The buffer 24b divides the input audio data (detection time period) into a plurality of blocks in step S2. One block is predetermined to be of the time period of, for example, several millisecond, the audio data is blocked according to the predetermined value. Therefore, in step S1, the data quantity written in the buffer 24b is set to the integral multiple of the time of one block.

Figure 4A:
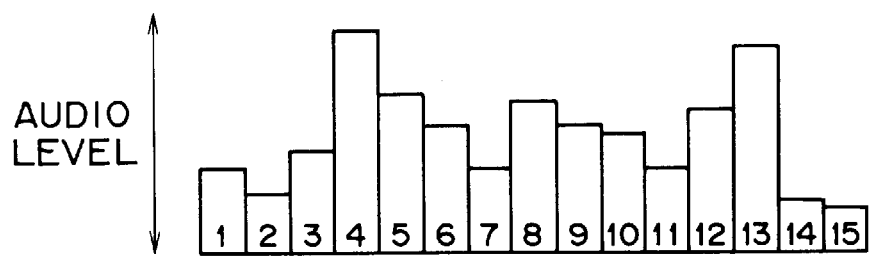
FIG. 4 is a diagram for describing processing through which the audio data is sent out.

In step S3, the audio level of each block is detected by the level detecting unit 29. FIG. 4A shows the detection result of respective 15 blocks formed by dividing the audio data stored in the buffer 24b.

In step S3, when detection of the level of the respective blocks is finished, then in step S4, the respective blocks are rearranged in the order of the level by the level detecting unit 29. In step S5, a threshold value of the data to be treated as a silence data is calculated by the level detecting unit 29. To calculate a threshold value, first the total quantity of the level value of the audio data stored in the buffer 24b is calculated (the data quantity of each block is accumulated). The level detecting unit 29 determines the percentage of the data (block) to be treated as silence data to the total data quantity which is necessary to realize the specified reproduction speed, and calculates a threshold value corresponding to the reproduction speed.

Figure 4B:
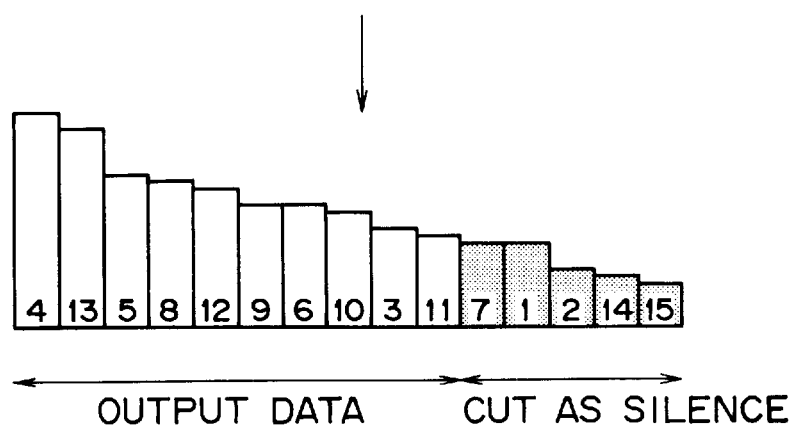

FIG. 4B shows an example in which the silence data is calculated with assumption that the number of blocks (threshold value) to be treated as silence data is 5 blocks. The reproduction in which all the 15 blocks are reproduced is the normal speed reproduction, and the reproduction in which 5 blocks are treated as silence data and the residual 10 blocks are reproduced is referred to as 1.5 times speed reproduction. Therefore, when a user selects other non-normal speed reproduction, the number of blocks to be treated as silence data (the number of blocks to be reproduced) varies depending on the selected reproduction speed.

Figure 4C:
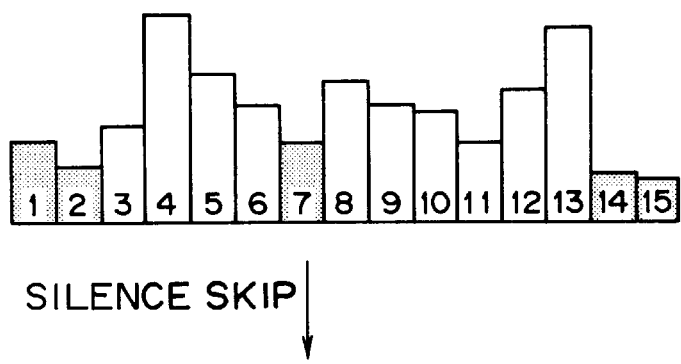

The block numbers of blocks having a value smaller than that of the calculated threshold value (the blocks to be treated as silence data) are stored in the silence pointer buffer 30. In step S6, the blocks which have been determined to be silence block are cut. The blocks which have been determined to be silence block (shaded blocks) are rearranged in the order of the block number as shown in FIG. 4A to obtain FIG. 4C. When such audio data is provided from the buffer 24b to the wave form connection processing unit 25, the blocks which have the block numbers which stored in the silence pointer buffer 30 are removed by the reading out address generating unit 31 because the address is not generated.

When the audio data is provided to the waveform connection processing unit 25, the connection of the switch 26a is switched from the buffer 24c to the buffer 24a, and the switch 26b is connected to the buffer 24b. By connecting the switches 26a and 26b as described herein above, the audio data supplied form the switch 26b is written in the buffer 24a, and the buffer 24b provides the audio data to the waveform connection processing unit 25.

Figure 4D:
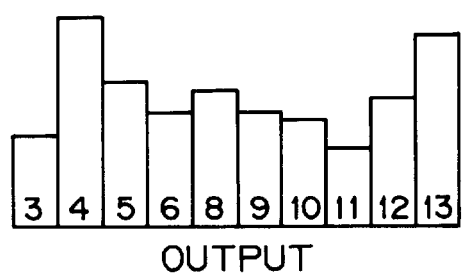
Figure 5:
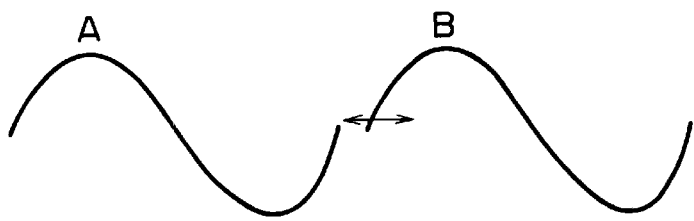
FIG. 5 is a diagram for describing processing which a waveform connection processing unit performs.

The waveform connection processing unit 25 performs connection processing of the block (waveform) of the input audio data in step S7. In detail, blocks as shown in FIG. 4D are provided from the buffer 24b because blocks which have been determined to be silence data are cut, in some cases, the waveform is discontinuous between blocks. If the audio data is provided to a speaker as it is for reproduction, then noise is generated. To suppress noise, the waveform connection processing unit 25 calculates the phase difference that minimizes the error between waveform A and waveform B to be connected by use of the mutual relation function as shown in FIG. 5, and the waveform B is delayed by the calculated phase difference to connect between the waveform A and waveform B smoothly.

The waveform of the audio data connected as described herein above is provided from the waveform connection processing unit 25 to a speaker not shown in the drawing in step S8, and reproduced. The reproduction timing code of the audio data is also provided from the waveform connection processing unit 25 and the reproduction timing code is supplied to the comparison unit 23.

Figure 6:
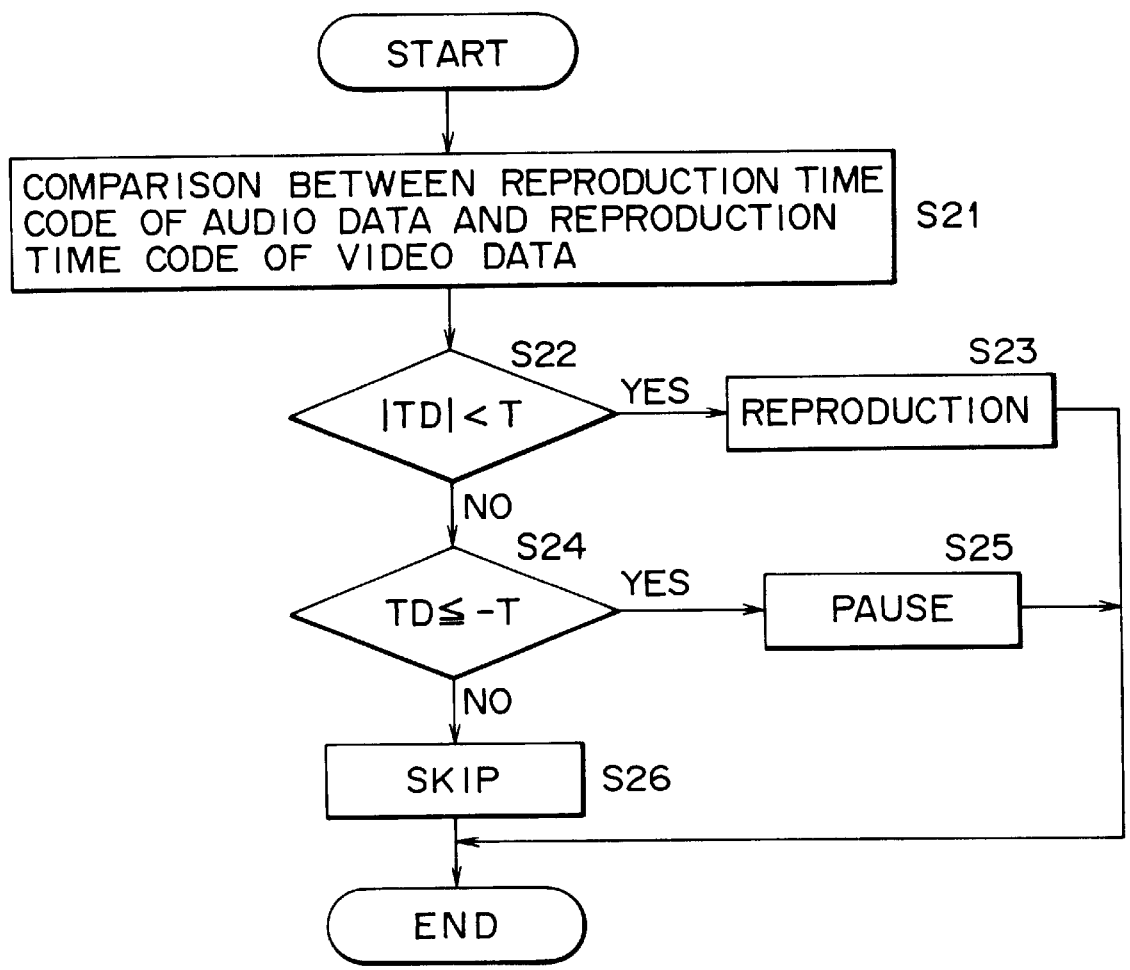
FIG. 6 is a diagram for describing processing which a comparison unit performs.

Next, the operation of the comparison unit 23 is described with reference to a flow chart shown in FIG. 6. In step S21, the reproduction time code of the audio data and the reproduction time code of the video data are supplied respectively from the waveform connection processing unit 25 and the video data processing unit 22 to the comparison unit 23. The comparison unit 23 compares two input reproduction time codes. The comparison unit 23 performs processing of step S22 and following processes by use of the comparison result.

T denotes a threshold value, and the time difference TD is a value calculated in step S21 by use of the following equation.

$$TD = (\text{time code of audio data}) - (\text{time code of video data})$$

In step S22, whether the absolute value of the time difference TD is smaller than the threshold value T is determined. If −T<TD<0, in other words, the audio data is behind the video data, the delay is assumed to be acceptable because the delay is smaller than the threshold value. On the other hand, if 0<TD<T, in other words, the audio data is in advance of the video data, the advance is assumed to be acceptable because the advance is smaller than the threshold value.

Therefore, in step S21, if the absolute value of the time difference TD is determined to be smaller than the threshold value, then the sequence proceeds to step S23, the comparison unit 23 provides a reproduction command to the video data processing unit 22. In detail, the data processed by the video data processing unit 22 is provided to a monitor not shown in the drawing and reproduced.

On the other hand, in step S22, if the absolute value of the time difference TD is determined to be larger than the threshold value, then the sequence proceeds to step S24. In step S24, whether the time difference TD is equal to or smaller than the negative value of the threshold value T is determined. If the time difference TD is determined to be equal to or smaller than the negative value of the threshold value T, in other words, the delay of the audio data is determined to be not negligible, then the sequence proceeds to step S25 to correct the delay, and a pause command is provided to the video data processing unit 22.

The video data processing unit 22 pauses in operation to provide processing video data for the delay time in response to reception of the pause command. After the elapse of the delay time, the processed video data is provided from the video data processing unit 22 to a monitor not shown in the drawing.

On the other hand, in step S24, if the time difference TD is determined to be not equal to or smaller than the negative value of the threshold value T, in other words, the relation TD>T is held, then the sequence proceeds to step S26. If the time difference TD is determined to be equal to or larger than the threshold value T, the relation indicates that the audio data is reproduced in advance of the video data so earlier as not negligible. Therefore, in step S26, the comparison unit 23 provides a skip command to the video data processing unit 22.

The video data processing unit 22 skips over the video data which is being processed partially corresponding to the time period for catching up with the audio data in response to the reception of the skip command. After the video data corresponding to the time period for catching up is skipped, the processed video data is provided from the video data processing unit 22 to a monitor not shown in the drawing.

The video data is reproduced, paused, and skipped synchronously with the audio data so that the audio and video data are properly paired as described herein above to mitigate the disordered feeling of a user during non-normal speed reproduction.

Figure 7:
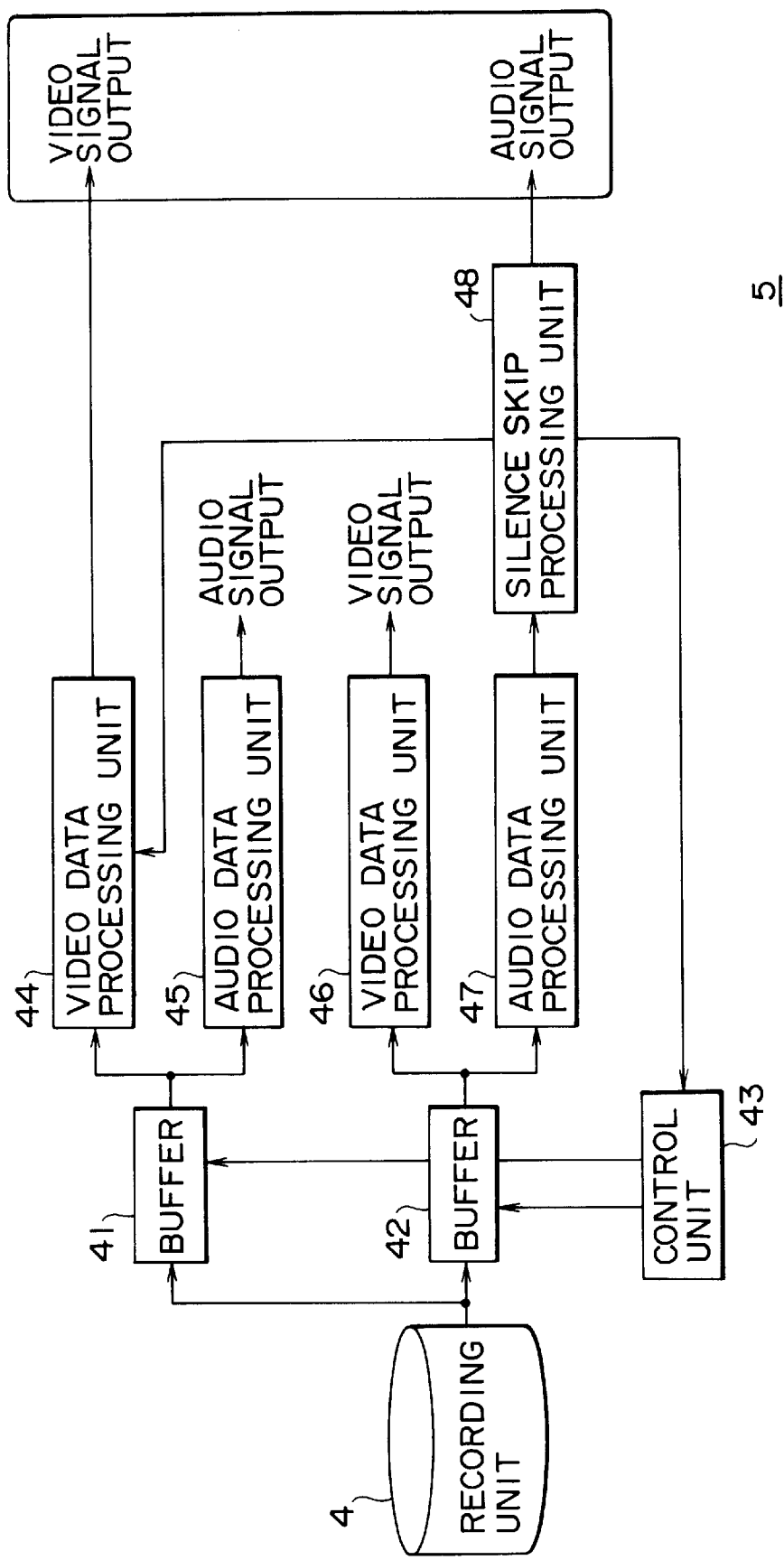
FIG. 7 is a block diagram for illustrating another exemplary structure of the reproducing unit.

FIG. 7 is a block diagram for illustrating the another exemplary structure of the reproducing unit 5. The data provided from the memory unit 4 is supplied to buffers 41 and 42. A controller 43 controls write processing and reads out processing of the data of the buffers 41 and 42. Out of the data stored in the buffer 41, the video data is processed by a video data processing unit 44 and the audio data is processed by an audio data processing unit 45.

Similarly, out of the data stored in the buffer 42, the video data is processed by a video data processing unit 46 and the audio data is processed by an audio data processing unit 47. The data processed by the audio data processing unit 47 is provided to a speaker not shown in the drawing by way of a silence skip processing unit 48. The silence skip processing unit 48 provides the time code of the audio data to the video data processing unit 44 and provides the data associated with the time required for silence skip processing to a control unit 43.

The same data is supplied from the memory unit 4 to the buffers 41 and 42 and stored. The buffer 41 is deployed to process the video data and the buffer 42 is deployed to process the audio data. In detail, the data stored in the buffer 41 is provided to the video data processing unit 44 and the audio data processing unit 45, and processed by both respective processing units, but the audio data processed by the audio data processing unit 45 is not used. Similarly, the data stored in the buffer 42 is provided to the video data processing unit 46 and the audio data processing unit 47, and processed by both respective units, but the video data processed by the video data processing unit 46 is not used.

The data processed by the audio data processing unit 47 is provided to the silence skip processing unit 48, and subjected to silence skip processing (the process shown in the flow chart of FIG. 3). The silence skip processing unit 48 provides the data associated with the time required for processing to the control unit 43, and provides a timing code for indicating the timing of output of the data to a television receiver not shown in the drawing to the video data processing unit 44.

The reason why the silence skip processing unit 48 provides the data associated with the time required for processing to the control unit 43 as described herein above is that processing in which a threshold value is set and the silence data is removed is performed in the time of several second unit, the time required for processing results in delay of the audio data from the video data, and the delay time must be absorbed. In other words, the control unit 43 reads out the data from the buffer 42, and reads out the same data from the buffer 41 after the delay time of the audio data.

Though the data read out from the buffer 41 is processed by the video data processing unit 44 and the audio data processing unit 45, only the video data processed by the video data processing unit 44 is provided according to the timing code supplied from the silence skip processing unit 48 to a television receiver not shown in the drawing.

By applying a method in which the same data is processed by two channels and the processing timing is shifted by a time delay caused from the processing of the audio data, the time difference between the video data and the audio data is eliminated. Though the data of the audio data processing unit 45 and the video data processing unit 46 are not used in the above-mentioned description, these outputs may be used in normal speed reproduction.

Figure 8:
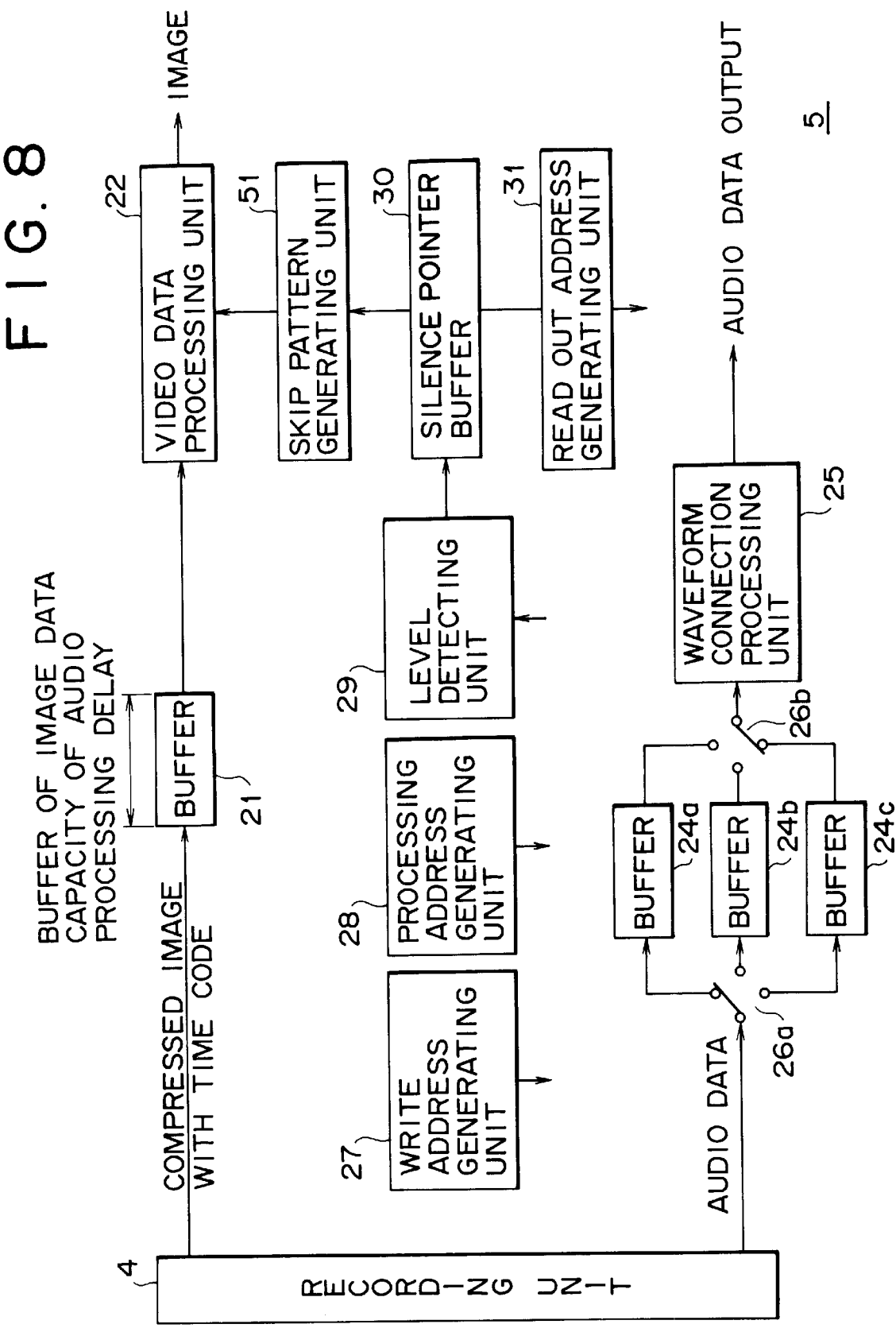
FIG. 8 is a block diagram for illustrating yet another exemplary structure of the reproducing unit.

FIG. 8 is a block diagram for illustrating another exemplary structure of the reproducing unit 5. In this exemplary structure, the comparison unit 23 shown in FIG. 2 is replaced with a skip pattern generating unit 51, the skip pattern generating unit 51 receives a signal from a silence pointer buffer 30, and provides the signal to the video data processing unit 22. Other components are same as those shown in FIG. 2.

Figure 9:
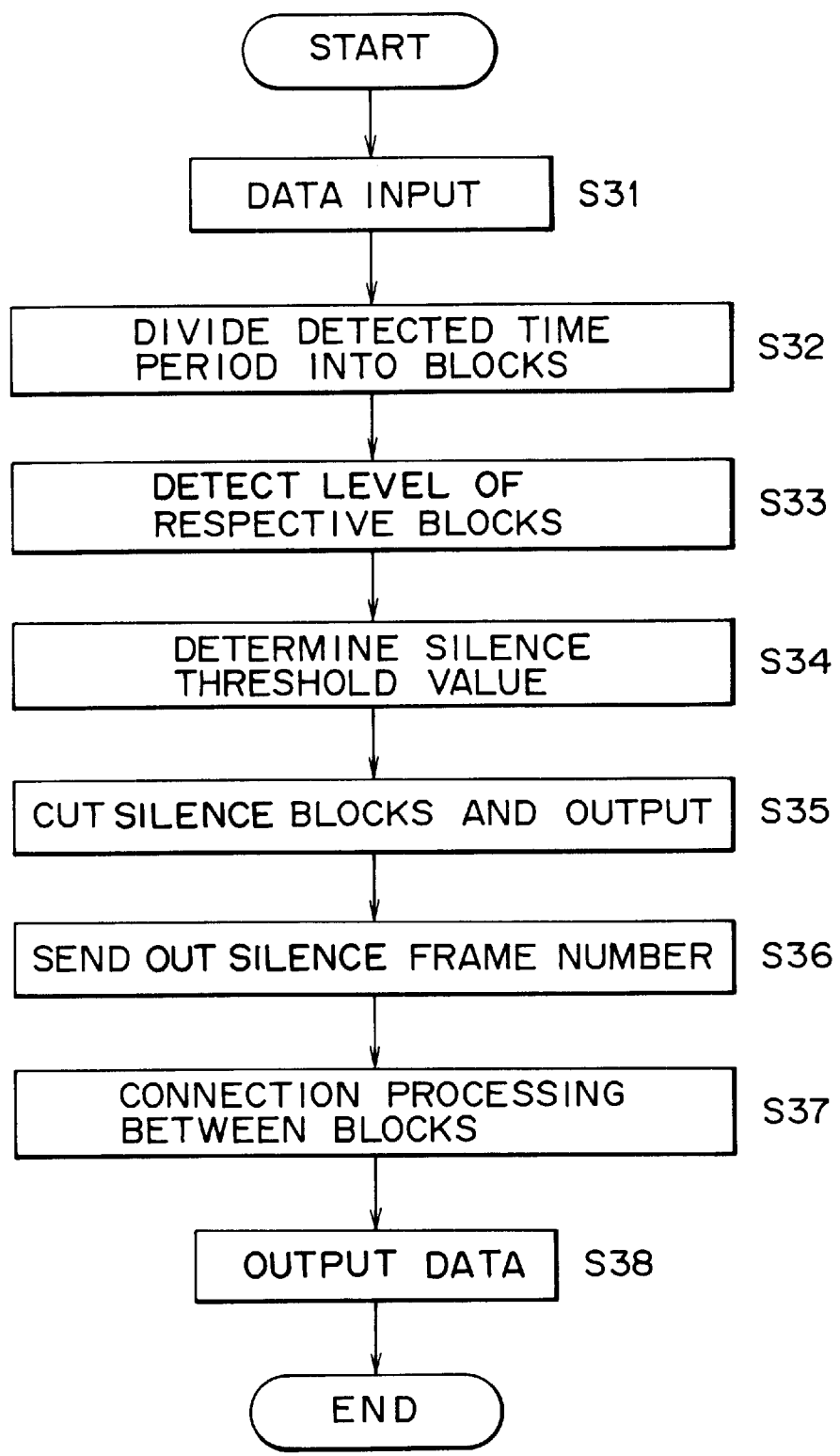
FIG. 9 is a flow chart for describing the operation of the reproducing unit shown in FIG. 8.

Processing of the audio data performed by the reproducing unit 5 is described with reference to a flow chart shown in FIG. 9. Processes of step S31 to S33 are same as those of respective step S1 to S3, and the description is omitted. A threshold value of the block to be treated as silence data is set by the level detecting unit 29 in step S34. The threshold value has been set previously so that the audio data which is not so much as not to prevent a user from understanding of the program content when it is skipped is treated as silence data.

Only one value may be set and this value is used as the threshold value, otherwise a plurality of threshold values are set and a threshold value is selected from among the threshold values corresponding to a program to be reproduced by a user.

In step S35, blocks which have been determined to be silence block are cut and are provided to the waveform connection processing unit 25. Processing in this step is the same as that described in step S6, and the description is omitted. The silence pointer buffer 30 provides a silence frame number to the skip pattern generating unit 51 in step S36.

Processes in step S37 and following steps are the same as those in step S7 and following steps, the description is omitted.

The skip pattern generating unit 51 provides the signal which functions to extract the video data corresponding to the input silence frame number to the video data processing unit 22. FIG. 10A to FIG. 10C show the relation between the audio data and the video data. FIG. 10A shows non-silence portion and silence portion of the audio data. The audio data is converted from FIG. 10A to FIG. 10B by cutting the silence portion (blocks). FIG. 10C shows the video data corresponding to the silence portion shown in FIG. 10A, and the skip pattern generating unit 51 provides the signal which functions to skip the video data to the video data processing unit 22.

For example, in the case that the data stored in the recording unit 4 is recorded by use of MPEG, the video data to be skipped is B-picture. B-picture can be removed without any effect on other images differently from I-picture and P-picture. By utilizing this feature, low speed reproduction can be possible. In detail, as shown in FIG. 11, at first, silence time period out of the audio data shown in FIG. 11A is prolonged (FIG. 11B) for slow reproduction. At that time, B-picture out of the video data in the silence portion (FIG. 11C) is displayed twice to continuously reproduce the image without intermission.

As described herein above, in the case that the audio data having the level lower than a predetermined threshold value is all treated as silence data and cut off to perform non-normal speed reproduction, the data quantity of silence data is not constant depending on the recorded data. Therefore, the reproduction speed is fast if much audio data is determined to be silence, on the other hand, the reproduction speed is nearly equal to the normal reproduction speed if a small quantity of audio data is determined to be silence.

Figure 12:
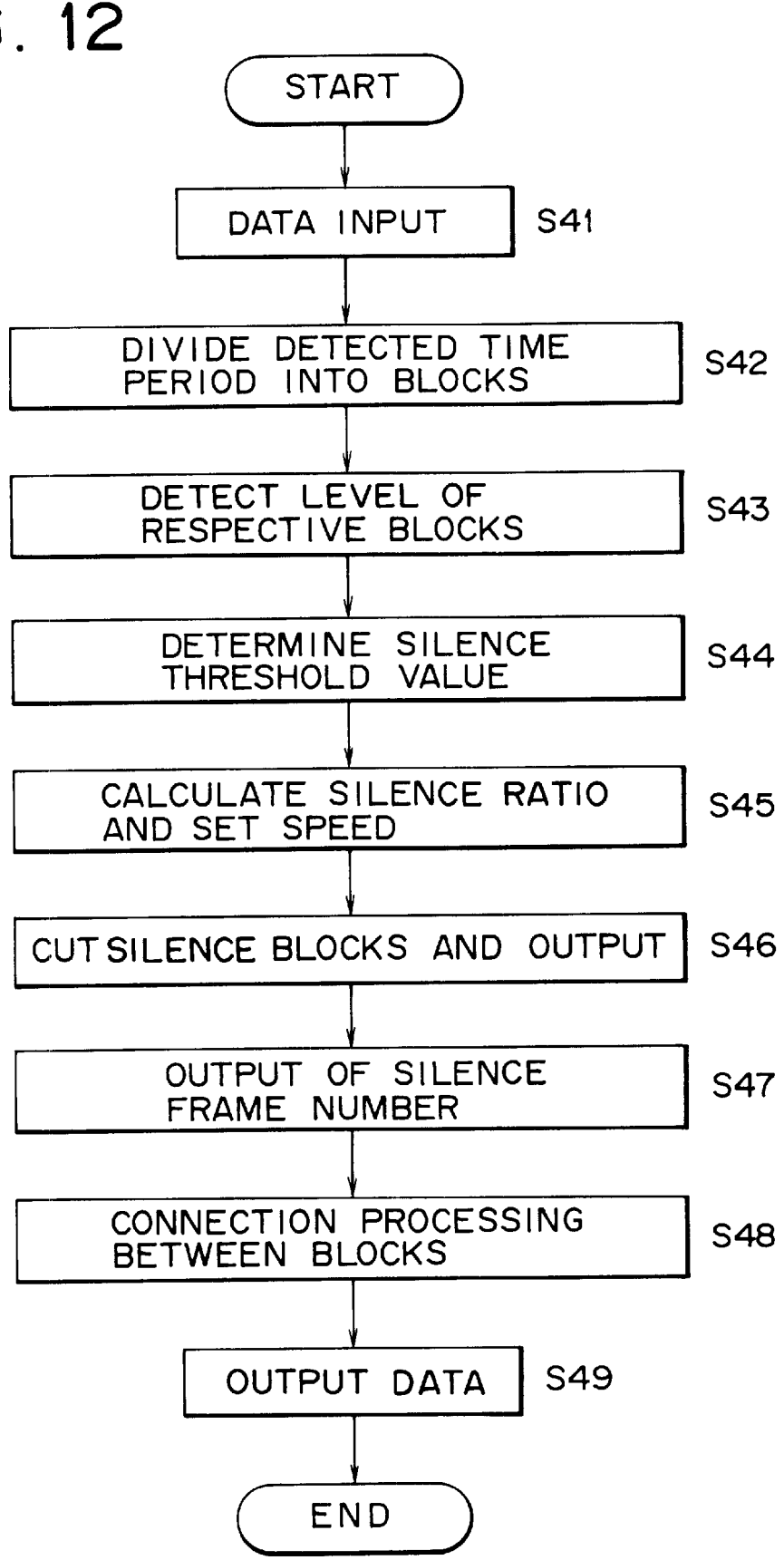
FIG. 12 is a flow chart for describing the other operation of the reproducing unit shown in FIG. 8.

Next, the other operation of the reproducing unit 5 shown in FIG. 8 is described with reference to a flow chart shown in FIG. 12. Processes in steps S41 to S44 are the same as those in steps in S31 to S34 shown in FIG. 9, the description is omitted. In step S45, the silence pointer buffer 30 calculates the silence ratio and sets the reproduction speed. In other words, percentage of the number of blocks having the level lower than the set threshold value to the number of blocks supplied to the buffer 24 in step S44 is calculated.

For example, in the case that the audio data supplied to the buffer 24 is divided into 15 blocks and 5 blocks are determined to be silence block out of 15 blocks, the ratio of silence data is (5/15). If the data is reproduced without reproducing the silence data (with skipping), then 10 blocks are reproduced, and the reproduction speed is (15/10), namely 1.5.

The reproduction speed data calculated as described herein above is provided to the skip pattern generating unit 51. After the processing in step 45, the sequence proceeds to step S46. Processes in step S46 and following steps are the same as those in step S35 and the following steps shown in FIG. 9, the description is omitted.

The skip pattern generating unit 51 provides the signal of the video data to be skipped to the video data processing unit 22 based on the reproduction speed provided from the silence pointer buffer 30. In the case of MPEG data, the video data to be skipped is B-picture as described herein above.

FIG. 13 shows the relation between the reproduction speed and B-picture to be skipped. In this example, 1 GOP (Group of Picture) consists of 15 frames, and the structure is shown on upper row in the drawing. In detail, I denotes I-picture, B denotes B-picture, and P denotes P-picture respectively. The reproduction speed is listed on the left side of the drawing. A mark X denotes a picture to be skipped.

In the case of the reproduction speed is 1.07 (=15/14), 1 B-picture is skipped. In the case of 1.15 (15/13), 2 B-picture is skipped. Similarly, the number of B-picture to be skipped varies depending on the reproduction speed.

The case of the reproduction speed less than 1 (slow speed reproduction) is described herein under. In FIG. 14 as in FIG. 13, 1 GOP consisting of 15 frames is shown on the upper row and the reproduction speed is listed on the left side. The low speed reproduction is realized by displaying the same B-picture twice. For example, in the case of reproduction speed of 0.94 (=15/16), 1 B-picture is displayed twice, in the case of reproduction speed of 0.88 (15/17), two B-pictures are displayed twice. In the case of lower reproduction speed, similarly the number of B-pictures to be displayed twice varies depending on the reproduction speed.

Figure 15:
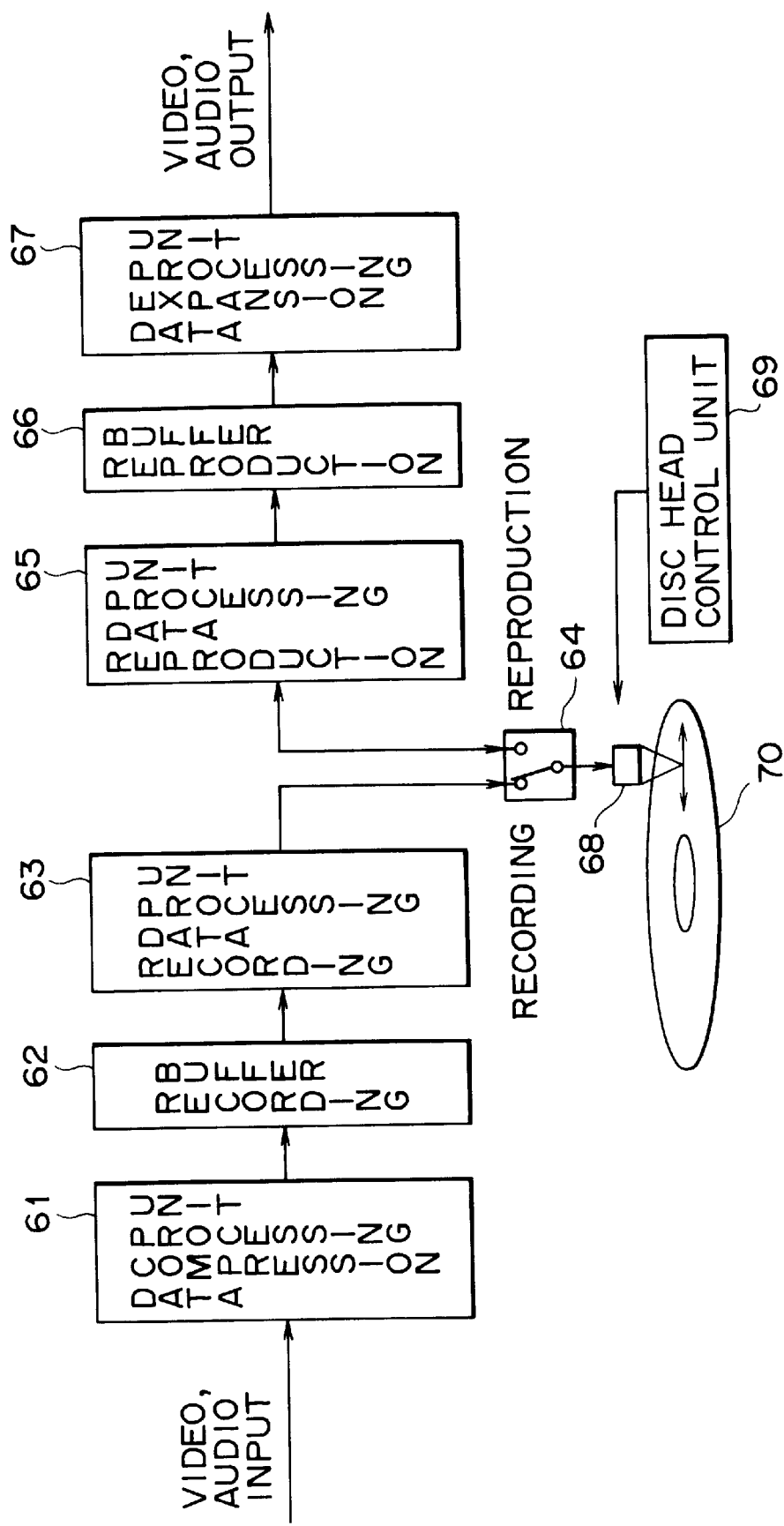
FIG. 15 is a block diagram for illustrating the exemplary internal structure of a recording/reproduction apparatus.

FIG. 15 shows an exemplary structure of a recording/reproduction apparatus which performs recording and reproduction simultaneously by use of the apparatus for non-normal speed reproduction which skips the above-mentioned silence data. The video data and audio data of a program to be recorded in the disc 70 is supplied to a data compression processing unit 61, subjected to compression, and supplied to a recording buffer 62. The data recorded in the recording buffer 62 is provided to a recording data processing unit 63, in which the data such as an error is added, and provided to a head 68 by way of a switch 64, and then recorded in a disc 70 by the head.

The data recorded in the disc 70 is read out from the head 68, and supplied to a reproduction data processing unit 65. The data supplied to the reproduction data processing unit 65 is subjected to processing such as error correction, and supplied to a reproduction buffer 86. The data recorded in the reproduction buffer 66 is provided to a data expansion unit 67 for expansion processing, and provided to a television receiver not shown in the drawing.

The disc head control unit 69 controls the position of the head 68 on the disk 70 and switching of a switch 64.

Figure 16:
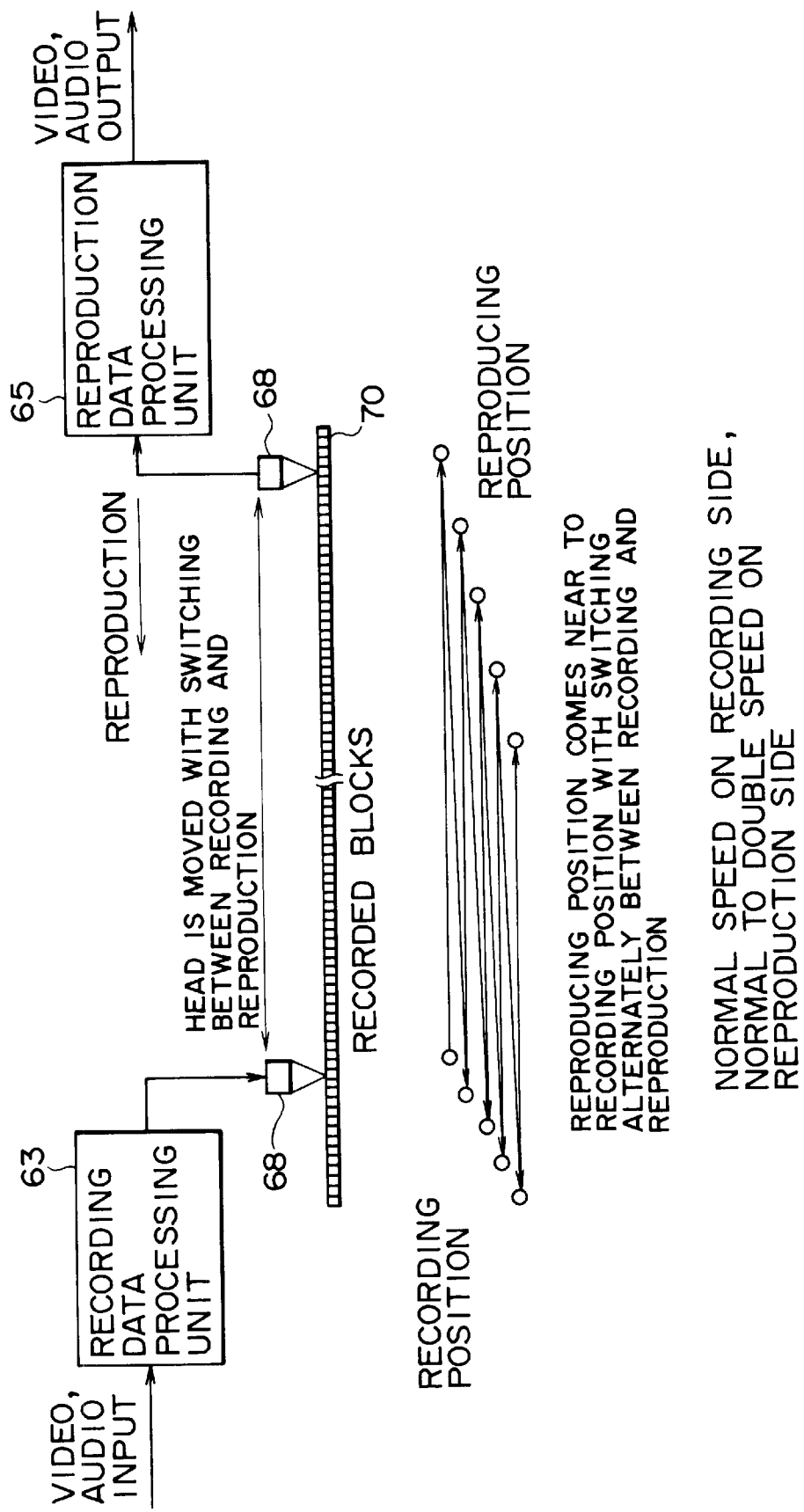
FIG. 16 is a diagram for describing the operation of the recording/reproduction apparatus shown in FIG. 15.
Figure 17:
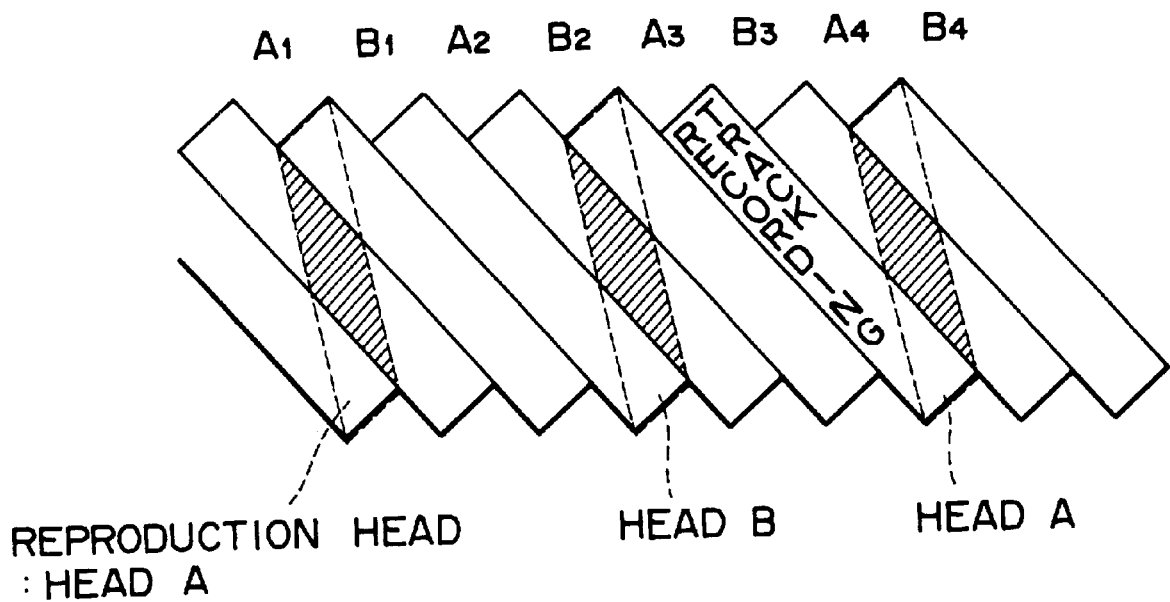
FIG. 17 is a diagram for describing a conventional multiple speed reproduction.

FIG. 16 is a diagram for illustrating the operation of the recording/reproduction apparatus shown in FIG. 15. The recording/reproduction apparatus can perform recording and reproduction simultaneously, and can continues recording while the recorded data is being reproduced. In detail, in the recording/reproduction apparatus, the disc head control unit 69 (FIG. 15) connects the switch 64 to the recording side and reproduction side alternately for simultaneous recording/reproduction so that the head 68 is positioned at the recording position and reproduction position alternately.

At that time, recording is performed at the normal speed and reproduction is performed at a faster speed. The non-normal speed reproduction is performed by skipping silence data. During such simultaneous recording and non-normal speed reproduction, the reproduction position catches up the recording position. For example, when a user wants to view a desired program with recording, and the user could not view the program from the beginning due to some reason. However, it provides a convenient function when the user missed not so much as the user wants to reproduce the program from the beginning after recording but the user wants to view from the beginning.

For example, the missed viewing is corresponding to 5 minutes from the beginning of the program. The user views the program corresponding to 5 minutes with double speed reproduction. The user can enjoy the program without difficulty in understanding of the content because reproduction is performed by skipping silence data as described herein above. The user can view the program corresponding to 5 minutes in 2.5 minutes. The missed program is viewed with non-normal speed reproduction, then the reproduction position comes to the recording position after about 10 minutes from the starting of the program.

The recording/reproduction apparatus stop reproduction when the recording position becomes coincident with the reproduction position. The user views the program which is being recorded on the normal broadcast from the time point when the reproduction is stopped, as the result the user can view the program from the beginning substantially.

As described hereinbefore, by cutting silence data to skip the video data corresponding to the cut silence data when non-normal speed reproduction is performed, a user is prevented from not understanding the program content which is being reproduced.

In the present invention, the distribution medium for providing a computer program for performing the above-mentioned processing to users includes information recording media such as not only magnetic discs and CD-ROM's but also network transmission media such as the internet and digital satellites.

As described hereinbefore, according to the recording/reproduction apparatus described in claim 1, the recording/reproduction method described in claim 4, and the distribution medium described in claim 5, because the input audio data is blocked into blocks of a predetermined time unit, a threshold value of the silence block to be treated as silence data is set correspondingly to an indicated reproduction speed, and the audio data is sent out after silence blocks having the level equal to or lower than the set threshold value are removed, it is possible to perform non-normal speed reproduction without preventing a user from understanding of the program content.

As described hereinbefore, according to the recording/reproduction apparatus described in claim 6, the recording/reproduction method described in claim 10, and the distribution medium described in claim 11, because the input audio data is blocked into blocks of a predetermined time unit, blocks having the level equal to or lower than a preset threshold value is removed as the silence block, and the reproduction speed is set correspondingly to the quantity of silence blocks, it is possible to perform non-normal speed reproduction without preventing a user from understanding of the program content.

What is claimed is:

1. A recording/reproduction apparatus comprising:
   reproducing means for reproducing the audio data;
   blocking means for blocking the audio data reproduced by said reproducing means into blocks of predetermined time unit;
   setting means for setting a threshold value of a silence block to be treated as silence data corresponding to an indicated reproduction speed;
   removing means for removing silence blocks of the level equal to or lower than said threshold value set by said setting means; and
   connecting means for connecting said blocks from which said silence blocks have been removed by said removing means.

2. A recording/reproduction apparatus as claimed in claim 1, wherein said recording/reproduction apparatus is provided additionally with output means for delaying the video data for a certain amount of time required to process the audio data or for thinning some video data corresponding to the certain amount of time required to process the audio data, and then for sending out the delayed or thinned video data.

3. A recording/reproduction apparatus as claimed in claim 2, wherein the video data thinned by said output means is B-picture.

4. A reproduction method comprising the steps of:
   reproducing the audio data;
   blocking said input audio data into blocks of a predetermined time unit;
   setting a threshold value of silence blocks to be treated as silence data corresponding to an indicated reproduction speed;
   removing silence blocks of the level equal to or lower than said set threshold value; and
   connecting said blocks from which said silence blocks have been removed.

5. A distribution medium for providing a program which is readable by a computer for executing a process comprising the steps of:
   blocking said input audio data into blocks of a predetermined time unit;
   setting a threshold value of silence blocks to be treated as silence data corresponding to an indicated reproduction speed;
   removing silence blocks of the level equal to or lower than said set threshold value; and
   connecting said blocks from which said silence blocks have been removed.

6. A reproduction apparatus comprising:
   reproducing means for reproducing the audio data;
   blocking means for blocking the audio data reproduced by said reproducing means into blocks of a predetermined time unit;
   removing means for removing blocks of the level equal to or lower than a preset threshold value as silence block;
   connection means for connecting said blocks from which said silence blocks have been removed by said removing means; and
   setting means for setting a reproduction speed corresponding to a quantity of said silence blocks.

7. A reproduction apparatus as claimed in claim 6, wherein said reproduction apparatus is provided additionally with output means for removing some video data corresponding to said silence blocks and for sending out the video data from which some video data has been removed.

8. A reproduction apparatus as claimed in claim 6, wherein said reproduction apparatus is provided additionally with determining means for determining the quantity of the video data to be removed corresponding to the reproduction speed which had been set by said setting means.

9. A reproduction apparatus as claimed in claim 6, wherein said reproduction apparatus performs slow speed reproduction by a method in which the reproduction of said silence blocks is prolonged and the video data corresponding to the prolonged reproduction is reproduced repeatedly.

10. A recording/reproduction method comprising:
    a step for reproducing the audio data;
    a step for blocking said reproduced audio data into blocks of a predetermined time unit;
    a step for removing blocks of the level equal to or lower than a preset threshold value as silence block;
    a connection step for connecting said blocks from which said silence blocks have been removed; and
    a setting step for setting a reproduction speed corresponding to the quantity of said silence blocks.

11. A distribution medium for providing a program which is readable by a computer for executing a process comprising:
    a blocking step for blocking the input audio data into blocks of a predetermined time unit;
    a removing step for removing blocks of the level equal to or lower than a preset threshold value as silence block;
    a connection step for connecting said blocks from which said silence blocks have been removed in said removing step; and
    a setting step for setting a reproduction speed corresponding to the quantity of said silence blocks.

* * * * *